United States Patent

[11] 3,629,487

| [72] | Inventors | Phillip W. Cuthbert;<br>William R. Neail, both of Chatsworth, Calif. |
|---|---|---|
| [21] | Appl. No. | 33,569 |
| [22] | Filed | May 1, 1970 |
| [45] | Patented | Dec. 21, 1971 |
| [73] | Assignee | Hexcel Corporation<br>Dublin, Calif. |

[54] PRESSURIZED MULTISTRAND CABLE AIR BYPASS AND TESTING DEVICE
9 Claims, 1 Drawing Fig.

[52] U.S. Cl. .................................................. 174/22 R,
  73/40.5 R, 137/15, 174/11 R, 174/23 R
[51] Int. Cl. .................................................. H02g15/28,
  G01m 3/28
[50] Field of Search .................................. 174/8, 10,
  11 R, 19, 20, 21 R, 22 R, 23 R, 76, 93; 156/47–49;
  73/40.5 R; 340/242; 137/1, 15, 315, 317, 343,
  356, 557, 560

[56] References Cited
UNITED STATES PATENTS

| 1,830,533 | 11/1931 | Eby | 174/10 UX |
| 1,933,348 | 10/1933 | Shanklin | 174/11 R UX |
| 2,261,742 | 11/1941 | Matsumoto | 174/21 R |
| 2,277,460 | 3/1942 | Shanklin | 174/21 R |
| 3,187,081 | 6/1965 | Bollmeier | 174/19 X |
| 3,215,761 | 11/1965 | Gelpey | 174/76 X |
| 3,422,211 | 1/1969 | Brisse et al. | 174/22 R |

*Primary Examiner*—Laramie E. Askin
*Attorney*—Townsend & Townsend

ABSTRACT: Sections of relatively soft, resilient tubes are inserted through a gas barrier into the pressurized portion of multistrand cables. The free ends of the tubes are connected to a self-closing valve communicating the tube interior with the exterior. The tube lengths are sufficient so that each tube length can be pinched off to temporarily interrupt the fluid communication between the corresponding pressurized cable and the valve and thus permit the independent testing of the pressure medium in the other one of the pressurized cables.

PATENTED DEC 21 1971
3,629,487
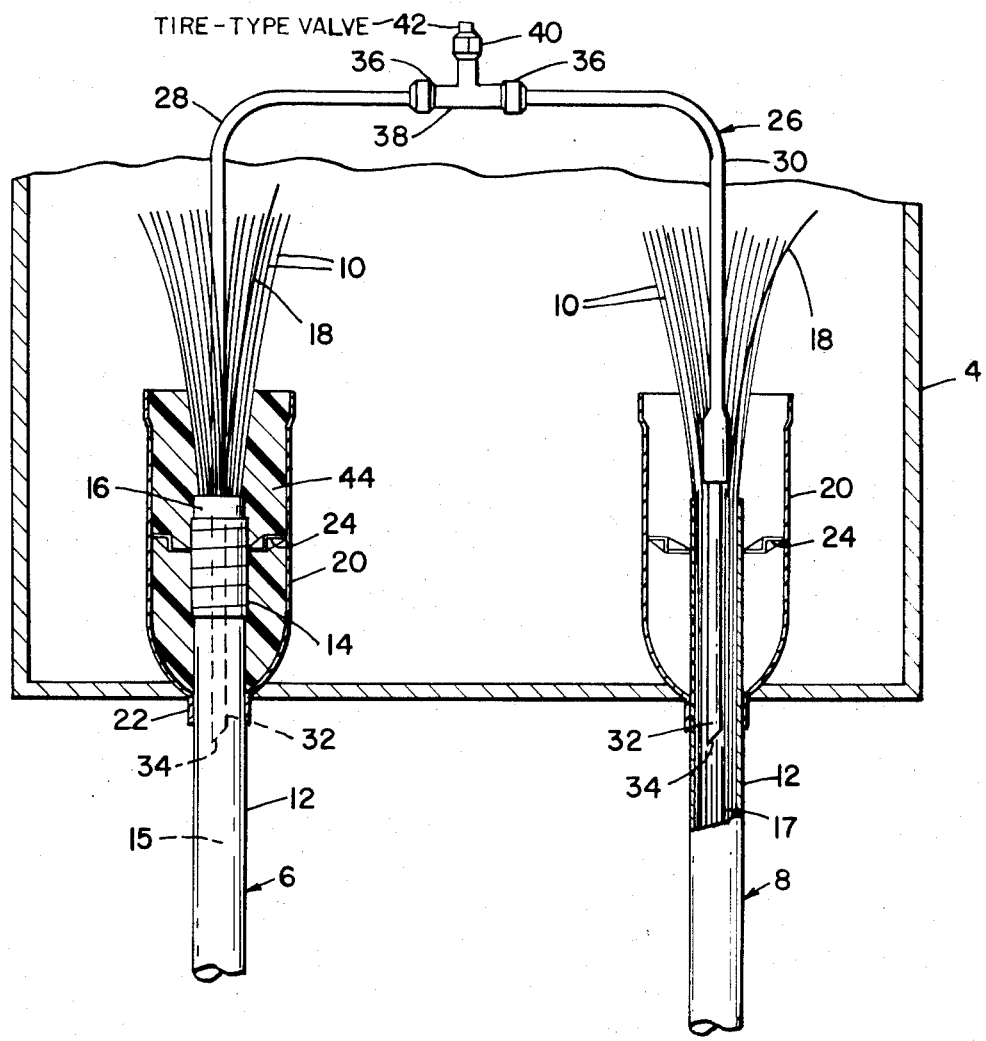
INVENTOR.
PHILLIP W. CUTHBERT
BY WILLIAM R. NEAIL
Townsend and Townsend
ATTORNEYS

PRESSURIZED MULTISTRAND CABLE AIR BYPASS AND TESTING DEVICE

BACKGROUND OF THE INVENTION

Multistrand cables, such as multistrand telephone cables, are frequently enclosed by an outer sheath and the cable interior is pressurized to keep out moisture, corrosives, dust and the like and thereby prolong the life of the cables. From time to time the cables are run into junction boxes for the connection of some or all of the cable strands to the strands of other cables which then leave the junction box as another cable which is again pressurized.

After entering the junction box the outer sheath is removed from the cable and a suitable, gastight barrier is provided to prevent the escape of pressurized air from the cable into the junction box and the atmosphere. Air pressure is preferably applied to the cable at a central point, such as a telephone exchange building. To pressurize the more remote cables, fluid connections must be provided between adjoining cable sections each time the cables are run into a junction box.

SUMMARY OF THE INVENTION

The present invention provides a low cost, readily installed and versatile connection between the pressurized portions of adjoining cables. Briefly, a conduit is provided and extends through a gastight barrier closing off ends of the pressurized portion of a multistrand cable against gas leakage out of the pressurized cable interior. The conduit is constructed of a relatively soft and resilient material and is connected to closeable means communicating the conduit interior with the exterior. The conduit has a sufficient length so that it can be doubled over and compressed to pinch it off and temporarily interrupt the fluid communication between the means and one or the other of the pressurized cable interiors. In this manner tests on the pressure medium, such as determining its pressure, can be independently performed on each pressurized cable interior of adjoining multistrand cables without the need for complicated and expensive equipment to temporarily fluidly separate the cable interior.

Preferably the means comprises a self-closing valve that is disposed about midway between the ends of the conduit entering the pressurized cable interior through the gastight barrier. The bypass device of the present invention is installed by inserting the free conduit ends generally parallel to the cable strands past the cutoff end of the outer cable sheath. Thereafter an enlarged diameter plastic, e.g., polyethylene sheet is wrapped about the outer sheath and extends axially beyond the sheath end. Self-setting resin is poured into the annular space between the wrapped around sheet and the cable strands to thereby rigidify the strands in the vicinity of the outer sheath end and build the gastight barrier. The conduit extending into the cable interior is also sealed and provides fluid communication to the portion of the cable subjected to the pressurized gas.

The bypass device engages the pressurization of a number of adjoining multistrand cables with a single pressure source. Additionally it enables the quick, simple and efficient testing of the pressure medium, e.g., air, in adjoining cables via the self-closing valve means by pinching off one or the other one of the conduits leading from the valve means to that pressurized cable which is not to be tested. The conduit can be manually pinched off and there is no need for clamps and like devices which can be overtightened and cause damage to the relatively soft conduits. After the test, the pinched off conduit is simply released to reestablish the fluid communication between the adjoining cables.

BRIEF DESCRIPTION OF THE DRAWING

The single FIGURE is a cross-sectional view of a junction box for a pair of cables and illustrates the bypass device of the present invention.

DESCRIPTION OF THE PREFERRED EMBODIMENTS

Referring to the drawing, a schematically illustrated junction box 4 houses ends of a pair of cables 6 and 8. Each cable is defined by a plurality of strands 10 disposed within a gastight outer sheath 12. In the junction box the strands of the two cables are suitably connected to each other, or to other strands from other cables (not shown).

The outer sheath is cut back and secured with tape 14 which is in turn secured to the cable by an adjustable ground wire clamp 16 to which a ground wire 18 is attached. Disposed about the outer sheath and the loose strands is a thin sleeve or mold 20 that is tied to the outer cable sheath by a tape collar 22 and that extends in an axial direction beyond the end of the outer cable sheath. A spacer 24 which permits fluid flow in an axial direction in the annular space between mold 20 and cable 6 or 8 is placed about the cable to maintain the cable and mold substantially concentric with respect to each other.

To seal the interior of the cables from the exterior at the outer sheath end, the annular space between the cable and the mold is filled with a hardening medium, such as a fast-setting, low exotherm urethane compound. The hardened compound provides a gastight barrier between the pressurized cable interiors 15 and 17, respectively, and the exterior of the cables To provide fluid communication between the pressurized portions of cables 6 and 8, the present invention provides a bypass device 26. The bypass device is defined by relatively long tubes or conduits 28 and 30 constructed of a resilient and relatively soft, that is, relatively readily deformable material such as rubber of a Durometer hardness of not more cables. about 90, so that the tubes can be readily pinched off. One end of the tube is connected to, e.g., pulled over a relatively hard, semirigid plastic tube segment 32 which terminates in a slanted end 34. The other ends of the tubes 28, 30 are connected to inlet ports 36 of a T-connector 38. Port 40 of the T-connector mounts a conventional self-closing and normally closed air valve 42, such as a pneumatic valve used on automobile tires, to seal off this port and to provide fluid communication to the interior of the T and, therewith, of tubes 28, 30.

Tubes 28 and 30 are preferably of equal length and are sufficiently long so that a center portion of the tubes can be doubled over and compressed to reduce the clear tube cross section to zero and thereby block passage of fluid materials while the tube is so compressed.

The bypass device 26 is installed to interconnect adjoining cables 6 and 8 by serially connecting a semirigid tubular segment 32, tube 28, T-connection 38, tube 30 and another tubular segment 32. After sheath 12 has been cut back, and before tape 14 is applied to the end of the sheath the semirigid tubular segments are inserted into cables 6 and 8 so that the slanted ends 34 of the segments extend into the pressurized cable portions 15 and 17. Thereafter the annular spaces between mold 20 and cables 6 and 8 are filled with resinous compound 44 in the above-described manner.

After the resinous compound has had time to set, the pressurized cable portions 15 and 17 are sealed and no pressurized air can escape into the junction box or the atmosphere past the end of outer sheath 12. At the same time the application of a pressurized medium, such as air, to one cable results in a transmission of the air to the next adjoining cable so that a number of adjoining cables can be pressurized with a single pressure source (not shown). Moreover, if needed, air can be bled from the cables by opening valve 42 or, if need be, pressurized air can be introduced into the cable past the valve in any suitable manner. Should testing be required, as for example where a pressure drop in the cable must be located, a pressure gauge (not shown) can be connected to valve 42 and one or the other one of tubes 28 and 30 can be successively pinched off so that the pressure gauge is responsive to the pressure in one of the cables 6 and 8 only. Should one of the cables have a leak, that leak can be localized in that manner.

As soon as the test has been performed, the pinched off tube is released and, by virtue of its resiliency, it returns to its original shape to continue the fluid communication between the two cables.

We claim:

1. A pressurized fluid bypass for providing fluid communication between adjoining, pressurized, multistrand cable ends, the strands extending through a gastight barrier on the cables preventing the escape of pressurized fluid from the cables, the bypass comprising: a conduit extending through the gastight barriers into the pressurized cable portions for fluidly communicating the pressurized portions, the conduit being constructed of a relatively soft, resilient material, valve means disposed intermediate the barriers for communicating the conduit interior to the atmosphere for providing access to the conduit interior and the pressurized medium, the conduit having a sufficient length to permit it to be pinched off to isolate the valve means from one of the pressurized cable portions and thereby enable independent access to the other one of the pressurized cable portions and the pressurized fluid therein via the valve means.

2. A bypass according to claim 1 wherein the valve means comprises a normally closed valve.

3. A bypass according to claim 1 wherein the valve means is spaced from the barriers by conduit sections, each section being of sufficient length to enable it to be pinched off.

4. A bypass according to claim 1 wherein the valve means comprises a single valve communicating with the conduit.

5. Apparatus for fluidly interconnecting sealed, pressurized portions of multistrand cables comprising: first and second branch lines, each line having an end thereof in fluid communication with the pressurized portion of one cable, the lines extending beyond the pressurized portions, means fluidly connecting and sealing the other ends of the branch lines, the means including a conduit to the atmosphere and valve means for closing the conduit to provide access to the pressurized medium, the lines being constructed of a flexible, resilient material and each line having a sufficient length permitting it to be flexibly bent over itself to temporarily close it off and thereby provide access to one or the other one of the pressurized cable portions only.

6. Apparatus according to claim 5 including means for bonding the line ends to the cables.

7. A method of providing access to the pressure medium in pressurized multistrand cables interconnected by an elongate conduit constructed of a resiliently deformable, relatively soft material comprising the steps of opening a valve disposed between the pressurized cables and communicating the interior of the conduit with the exterior thereof, pinching off a section of the conduit disposed between the valve and one of the pressurized cables to interrupt the fluid communication between such cable and the valve means to thereby provide access to the other one of the pressurized cables only.

8. A method according to claim 7 wherein the step of pinching off comprises the steps of doubling over itself a length of the section and compressing the doubled-over length of the section to thereby close that section and interrupt the fluid communication.

9. A method according to claim 8 including the step of maintaining the section in its doubled-over, compressed position while access to the pressurized cable only is required, and thereafter releasing the doubled-over section to reestablish communication between the cables by permitting the section to resiliently return to its original position.

* * * * *